United States Patent
Liburdi

(10) Patent No.: US 6,624,364 B2
(45) Date of Patent: Sep. 23, 2003

(54) MULTIFUNCTION STALK-MOUNTED SWITCH

(75) Inventor: Steven Albert Liburdi, Clinton Township, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 111 days.

(21) Appl. No.: 09/915,151

(22) Filed: Jul. 25, 2001

(65) Prior Publication Data

US 2003/0019731 A1 Jan. 30, 2003

(51) Int. Cl.$^7$ .................................................. H01H 9/00
(52) U.S. Cl. ...................................................... 200/61.27
(58) Field of Search ............................ 200/61.27, 61.54

(56) References Cited

U.S. PATENT DOCUMENTS

| | | | |
|---|---|---|---|
| 4,393,280 A | 7/1983 | Iwata et al. | 200/61.27 X |
| 4,810,839 A | 3/1989 | Chretien | 200/61.27 X |
| 4,942,273 A | 7/1990 | Furuhashi et al. | 200/61.54 |
| 5,003,132 A | 3/1991 | Lagier | 200/61.27 X |
| 5,047,600 A | 9/1991 | Enari et al. | 200/61.54 |
| 5,049,706 A | 9/1991 | Du Rocher | 200/61.54 |
| 5,272,290 A * | 12/1993 | Suzuki et al. | 200/61.54 X |
| 5,804,784 A * | 9/1998 | Uchiyama et al. | 200/61.54 |
| 5,859,396 A | 1/1999 | Yokoyama | 200/61.54 |
| 6,399,905 B1 * | 6/2002 | Nishikawa et al. | 200/61.54 |

* cited by examiner

*Primary Examiner*—Renee Luebke
(74) *Attorney, Agent, or Firm*—Bill C. Panagos; MacMillan, Sobanski & Todd, LLC

(57) ABSTRACT

A multifunction stalk switch combines a pivoting lever and an internal rod which can be independently rotated and slid in an axial direction to control multiple functions, including separate control of wiper on/off/intermittent settings, an intermittent delay setting, and a washer spray function. A robust design is achieved by avoiding the need for any wiring or circuit boards within the lever arm itself and locating all electrically conductive components in the base. Relief notches in the lever prevent sliding contacts from moving away from the circuit board when the lever arm is pushed in a direction perpendicular to the desired pivot plane.

16 Claims, 5 Drawing Sheets

MULTIFUNCTION STALK-MOUNTED SWITCH

BACKGROUND OF THE INVENTION

The present invention relates in general to a stalk-type lever switch for mounting to an automotive steering column, and, more specifically, to a stalk switch with provision for separately controlling wiper on/off/intermittent settings, an intermittent delay setting, and a washer spray function.

Stalk-type lever controls mounted to an automotive steering column for controlling windshield wiper and washer functions have become well accepted in the automotive industry. Various arrangements have been conceived for controlling multiple functions. These typically use various electrical switches and sliding contacts at the base and in the head of the stalk. Functions that may be controlled include wiper motor on continuous, wiper motor on intermittent, intermittent wiper delay setting, washer spray on, headlights and/or running lights on/off, high beam headlights on/off, turn signal lights on/off, etc.

In order to be successful, a stalk-type lever control should be robust, durable, and inexpensive to manufacture. To achieve the multiple control actions, however, the lever controls have become complicated. A lever often combines several different control action movements including axial rotation, circumferential rotation, and longitudinal displacement. Axial rotation may typically include either pivoting in a plane perpendicular to the axis of the steering column (as is sometimes used for controlling windshield wipers) or pivoting in a plane parallel with the axis of the steering column (as is sometimes used for controlling headlamp high beams). Circumferential rotation includes pivoting a ring around the longitudinal axis of the lever (as is used for controlling intermittent wiper delay). Longitudinal displacement may include a push button at the tip of the lever (as is sometimes used for controlling windshield washers). Combining these actions in a single structure has continued to be a challenge.

Robustness of a structure includes the ability to withstand forces applied in directions other than those being used for control actions. For example, a lever designed to pivot in only one plane (e.g., perpendicular to the axis of the steering column) must not malfunction if the lever is pushed in a direction outside that plane (e.g., in a direction parallel to the axis of the steering column).

SUMMARY OF THE INVENTION

The present invention provides an improved structure for a multifunction stalk-mounted switch having the advantages of robustness, durability, and ease of manufacture.

In one aspect, the multifunction switch apparatus comprises a lever including a lever arm having a distal end for manually manipulating the switch apparatus, a control frame at a proximal end of the lever, and a longitudinal bore. A case pivotally retains the control frame for movement in a pivot plane defined by a pivot axis. A circuit board is mounted in the case and comprises circuit traces on a surface thereof. A first contact is mounted to the control frame and slidably contacts the circuit traces. A rod is movably retained in the longitudinal bore and has a proximal end and a distal end. The rod includes a radial control arm and a drive surface at the proximal end. A contact carrier is rotatably mounted within the control frame and is coupled to the radial control arm so that the contact carrier rotates in response to axial rotation of the rod. A second contact is mounted to the contact carrier and slidably contacts the circuit traces. A plunger is biased in a first position and has a cam surface for receiving the drive surface and moves into a second position in response to longitudinal movement of the rod. The plunger includes an actuator surface. An on/off contact switch is mounted to the circuit board and makes selectable contact in response to the actuator surface.

DETAILED DESCRIPTION OF PREFERRED EMBODIMENTS

Figure 1:
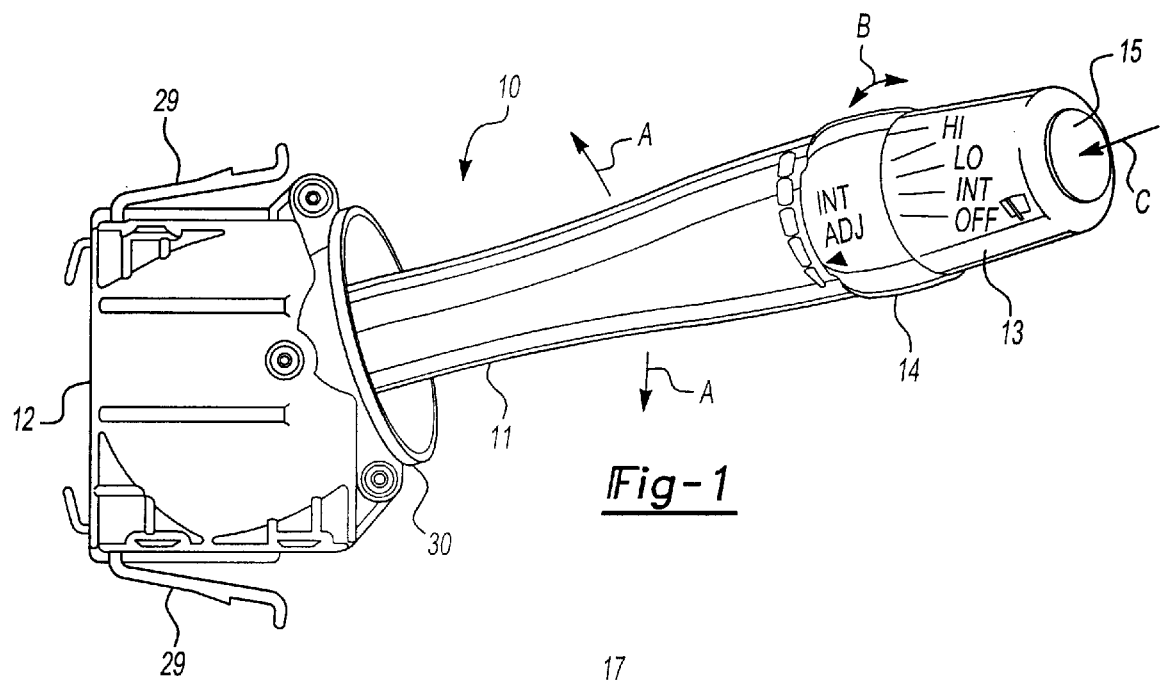
FIG. 1 is a front plan view of a multifunction switch according to the present invention.

Referring to FIG. 1, a multifunction switch apparatus 10 includes a lever 11 and a housing 12. In a preferred embodiment, switch apparatus 10 is shown as a wiper control stalk. Lever 11 is pivoted as indicated by arrows A for setting a wiper motor to settings of off, intermittent, low, or high as is indicated on switch apparatus 10 by wiper-function graphics 13. An intermittent control ring 14 may be circumferentially rotated as shown by arrow B to control delay time when the wiper motor setting is set at intermittent. A washer push button or cap 15 can be depressed in the direction of arrow C to activate a washer motor that produces a washer spray.

Retainer clips 29 of housing 12 snap into a housing for a steering column (not shown). A collar 30 provides a bezel for interfacing switch apparatus 10 with the steering column.

Figure 2:
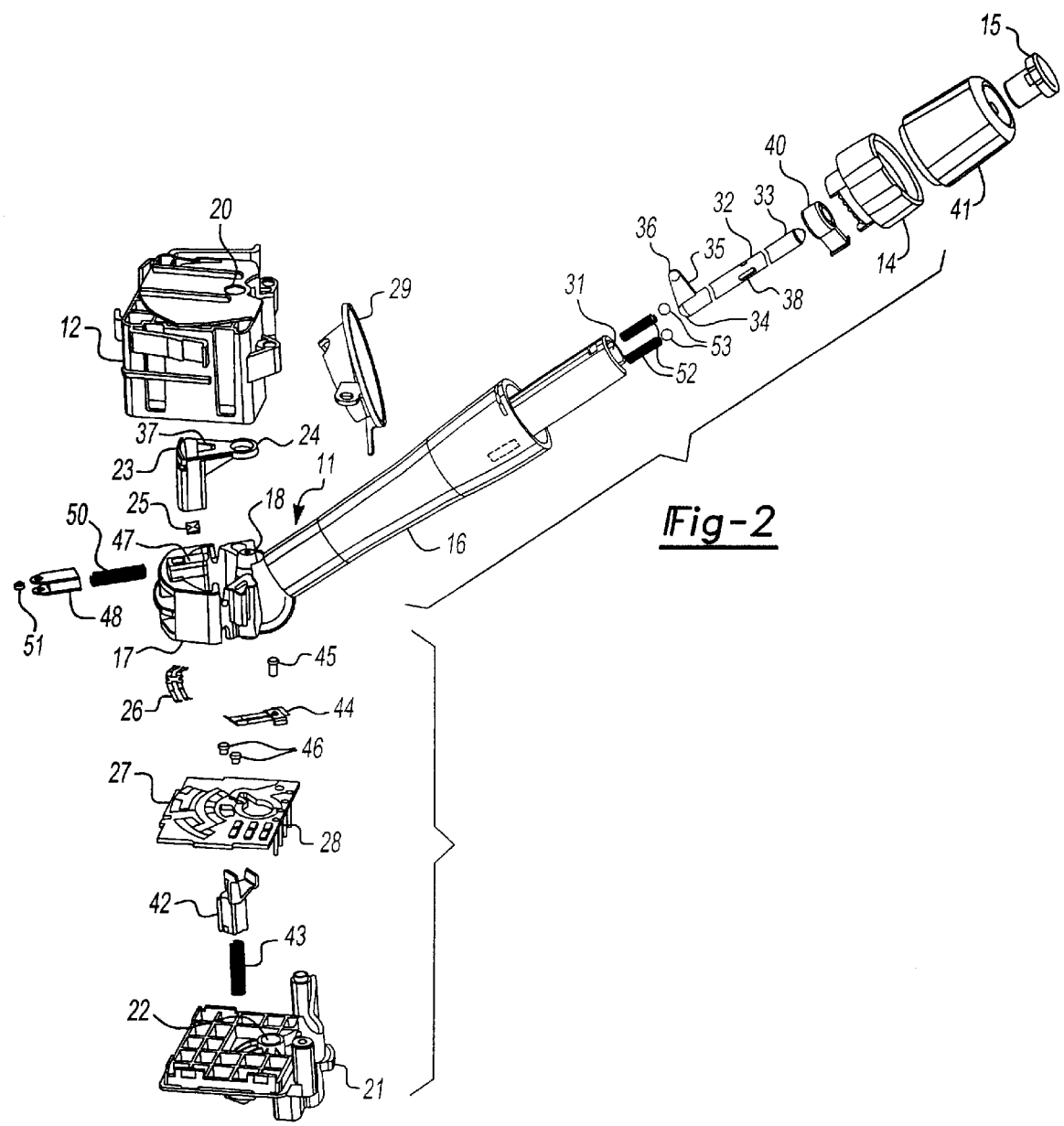
FIG. 2 is a front exploded view of the switch.

Referring to FIG. 2, lever 11 includes a lever arm 16 and a control frame 17. An integrally formed pivot post 18 extends above and below lever 11 and provides a pivot axis according to arrows A in FIG. 1. Housing 12 includes a pivot hole 20 for receiving pivot post 18 and a cover plate 21 for attaching to housing 12 includes a pivot hole 22 for receiving the opposite end of pivot post 18. Pivot post 18 provides the pivot axis for pivot movement of lever 11 in accordance with arrows A (FIG. 1).

A contact carrier 23 includes a sleeve 24 for fitting over pivot post 18 so that contact carrier 23 rotates in the interior of control frame 17. A sliding contact 25 comprised of a conductive metal wiper is mounted to the bottom side of contact carrier 23. A sliding contact 26 also comprised of a conductive metal wiper is mounted to the bottom side of control frame 17.

A printed circuit board 27 containing conductive traces for implementing desired switch functions is retained in housing 12 between the bottom side of control frame 17 and cover plate 21, so that sliding contacts 25 and 26 slidably engage the conductive traces. A plurality of connector pins 28 extend from circuit board 27 and through cover plate 21 for joining with a wiring harness (not shown) in the steering column.

Lever 11 contains a longitudinal bore 31 extending from the distal end of lever arm 16 to its proximal end to merge with the interior space of control frame 17. A rod 32 is retained in bore 31 for longitudinal (or axial) and radial movement. Rod 32 has a distal end 33 and a proximal end 34. A control arm 35 at proximal end 34 includes a ball 36 at its end which engages a socket 37 in contact carrier 23. Ball 36 acts as a drive surface for pushing against socket 37. Offset from distal end 33 is an alignment guide 38 which engages a bur 40. Bur 40 is captured in intermittent control ring 14 so that rotation of ring 14 results in rotation of ball 36.

A knobcase 41 is solidly connected to lever arm 16 in a manner that does not interfere with rotation of ring 14. Washer push button 15 extends through knobcase 41 to received distal end 33 of rod 32. A push surface inside washer push button 15 (not shown) abuts with distal end 33 when in its unactivated position such that the abutment does not interfere with rotation of rod 32.

Proximal end 34 of rod 32 abuts with a plunger 42 which extends through circuit board 27. Plunger 42 is biased into an upward position by a bias spring 43. One end of a leaf contact 44 is attached to circuit board 27 by a rivet 45. Leaf contact 44 is shaped so that the other end of leaf contact 44 is biased against a pair of contact rivets 46 on circuit board 27. The bias of plunger 42 overcomes the bias of leaf contact 44 to break the connection, and the action of distal end 34 of rod 32 against plunger 42 causes contact of leaf contact 44 with contact rivets 46 as is discussed below with reference to FIG. 7.

Contact frame 17 includes a detent holder 47 which captures a detent finger 48 and a detent spring 50. A detent roller 51 is carried at the end of detent finger 48 to engage detent slots on the interior surface of housing 12 and to thereby establish detent positions for pivoting of lever 11 in the direction of arrows A (FIG. 1) to control wiper motor settings.

Lever arm 16 includes slots for receiving detent springs 52 and ball bearings 53 at diametrically opposite sides of lever arm 16. Ball bearings 53 engage an interior race in ring 14 with recess points for providing detent positions for the rotation of ring 14 along arrows B (FIG. 1) to control intermittent delay time.

Figure 3:
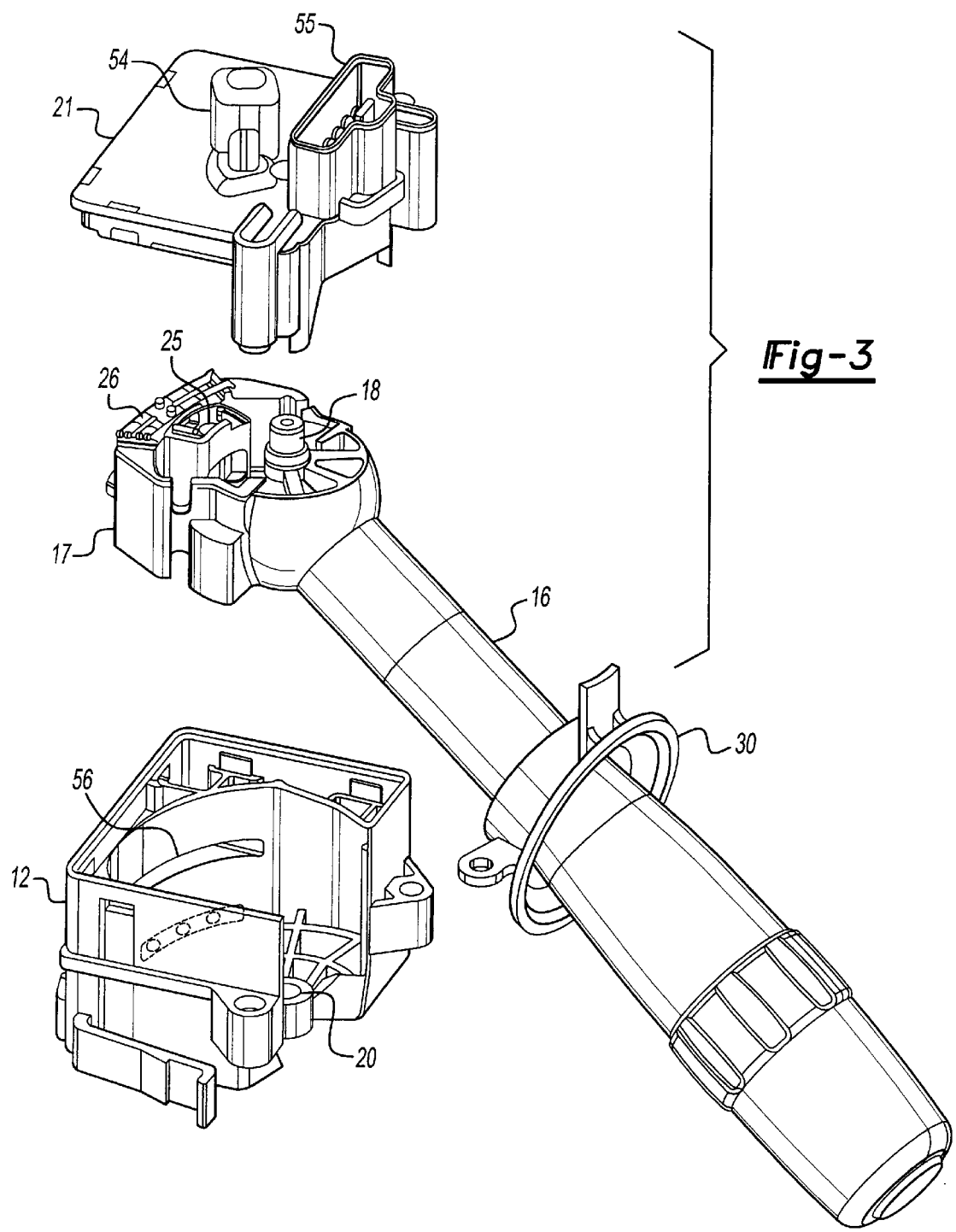
FIG. 3 is a bottom exploded view of the switch.

FIG. 3 is a bottom, partially exploded view of the switch apparatus showing the mounting of sliding contacts 25 and 26 to contact carrier 23 and control frame 17, respectively. Cover plate 21 includes a plunger box 54 for receiving plunger 42 and a connector box 55 for receiving connector pins 28.

Figure 4:
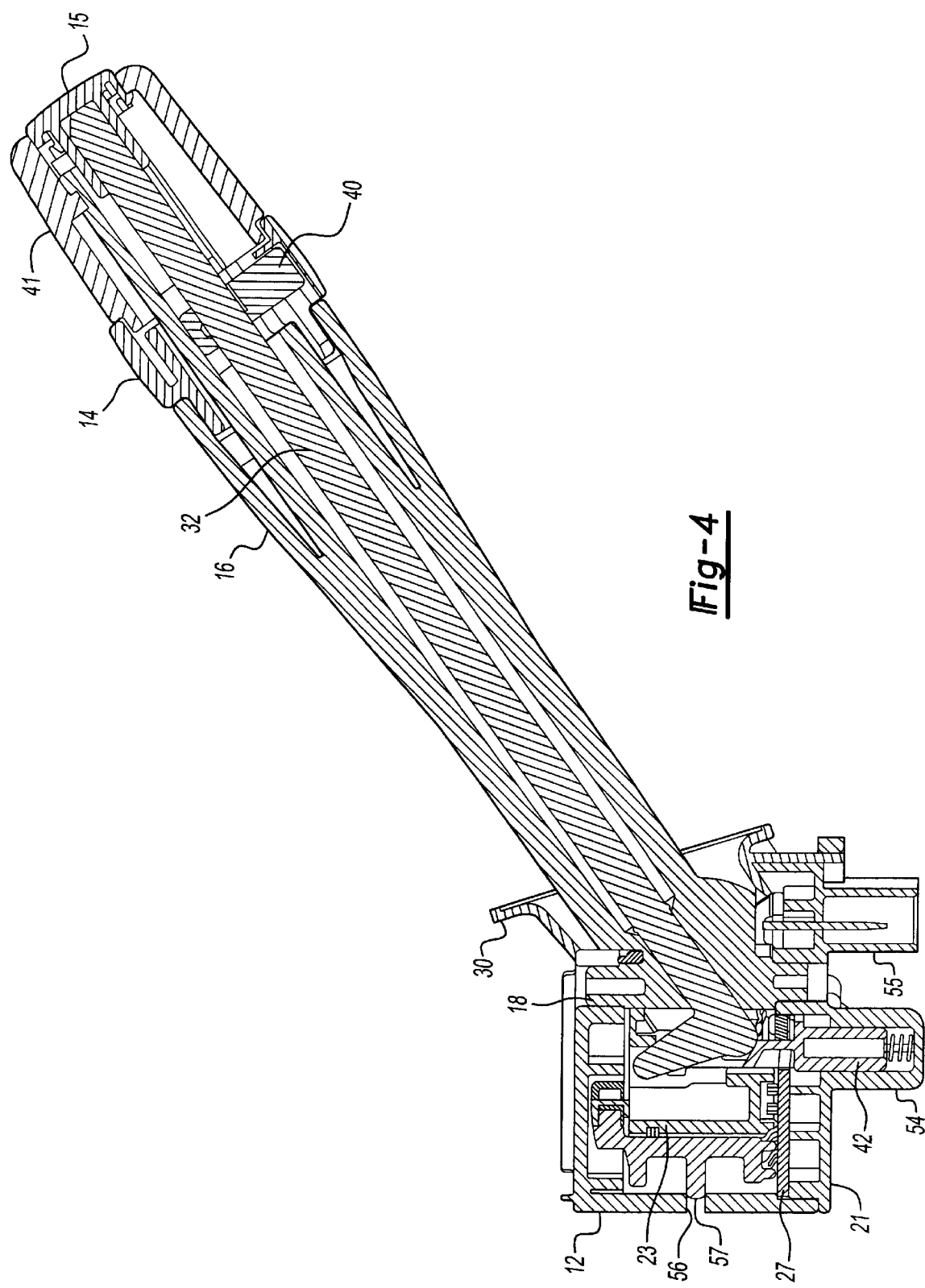
FIG. 4 is a central cross section view of the switch.

The cross-sectional view of FIG. 4 shows a groove 56 in housing 12 for receiving a tongue 57 formed along the outside edge of control frame 17. The tongue and groove are arranged to help guide the pivot motion of lever 11 in the desired pivot plane in conjunction with pivot post 18 and pivot holes 20 and 22.

Figure 5:
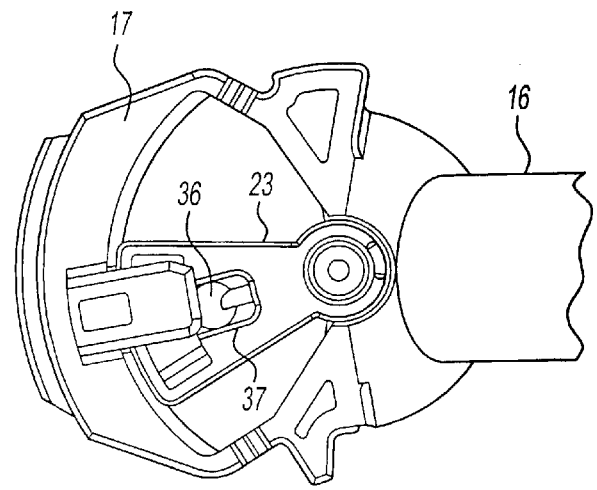
FIG. 5 is a perspective view of a portion of the switch showing the contact carrier in one position.
Figure 6:
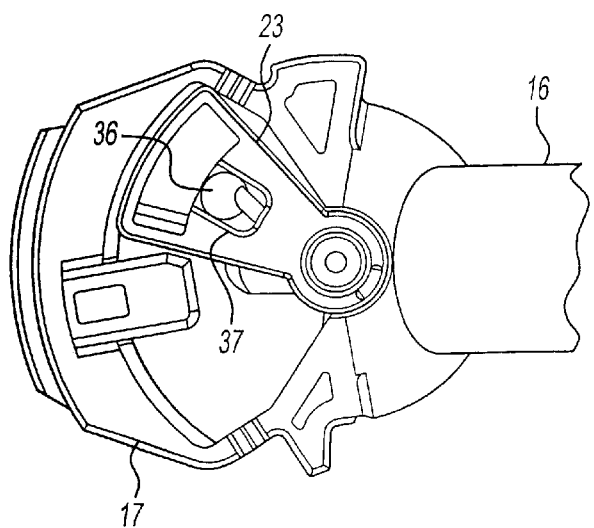
FIG. 6 is similar to FIG. 5 showing the contact carrier moved into a second position by rotation of the rod.

Referring to FIGS. 5 and 6, the action of ball 36 controlling rotation of contact carrier 23 within control frame 17 is illustrated. When rod 32 is rotated under manual control of ring 14, ball 36 swings a corresponding arc. Since ball 36 is received in socket 37, contact carrier 23 swings its own corresponding arc between respective detent positions of FIGS. 5 and 6. Consequently, sliding contact 25 moves to the respective circuit traces on circuit board 27 corresponding to the detent positions to obtain each respective intermittent wiper delay time or rate. Contact carrier 23 also moves whenever control frame 17 is pivoted under control of lever arm 16. However, this motion is not important since sliding contact 25 is only used when control frame 17 is in the position corresponding to the wipers being set to intermittent.

Figure 7:
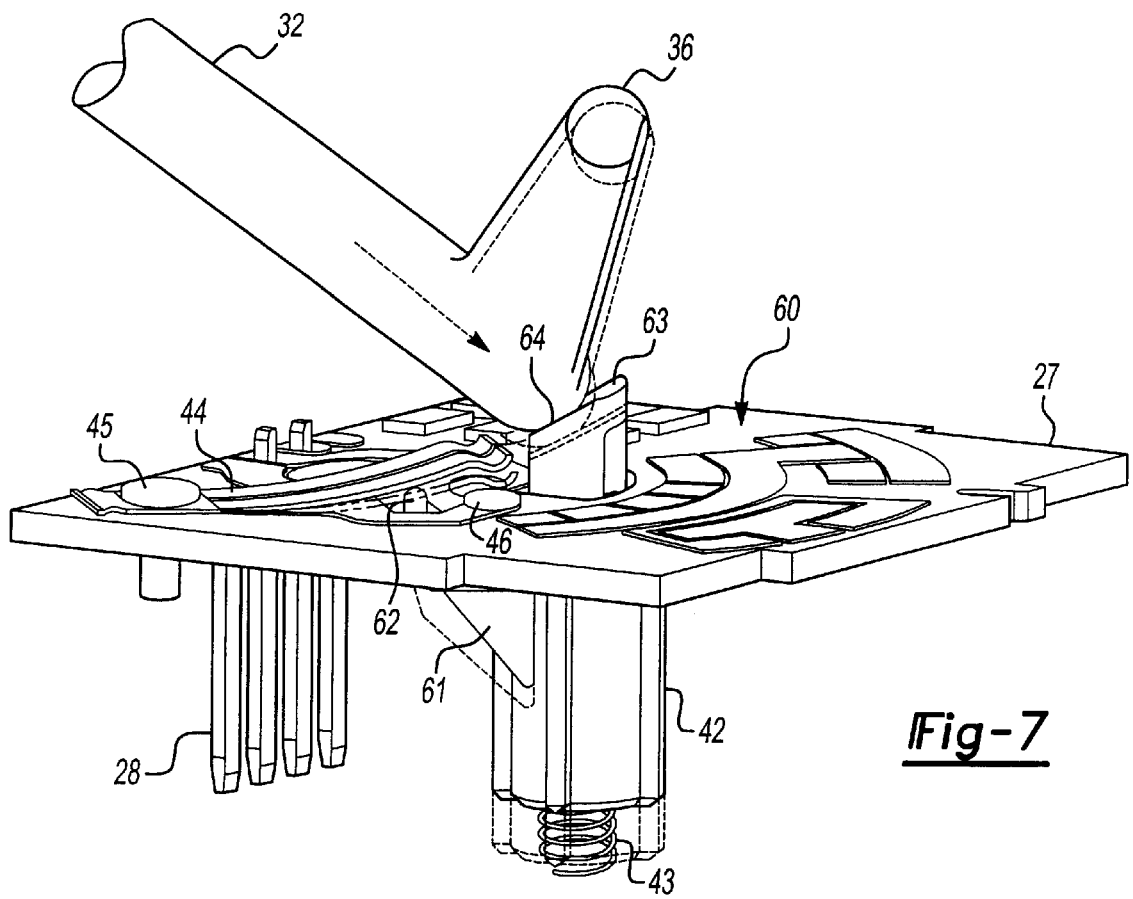
FIG. 7 is a perspective view showing interaction of the rod and plunger.

Referring to FIG. 7, actuation of the on/off washer spray switch by longitudinal movement of rod 32 will be described in greater detail. Plunger 42 has a slanted cam surface 63 for slidably engaging a drive surface 64 at the proximal end of rod 32. When plunger 42 is in its first position shown in FIG. 7, drive surface 64 has not yet acted on cam surface 63. Plunger 42 has a disengagement arm 61 terminating in an actuator surface 62 which pushes up on leaf contact 44 to separate their contact ends from rivets 46.

When washer push button 15 is pressed, rod 32 moves longitudinally (as shown by the dashed arrow) so that drive surface 64 pushes against cam surface 63 and plunger 42 moves to a second position (shown by dashed lines). Actuator surface 62 is retracted and leaf contact 44 follows its natural bias and moves into contact with rivets 46. When washer push button 15 is released, plunger 42 moves back to the first position as a result of action by bias spring 43 thereby breaking contact between leaf contact 44 and rivets 46. By providing a positive disengagement between leaf contact 44 and rivets 46, any potential contact welding as a result of arcing is avoided.

Figure 8:
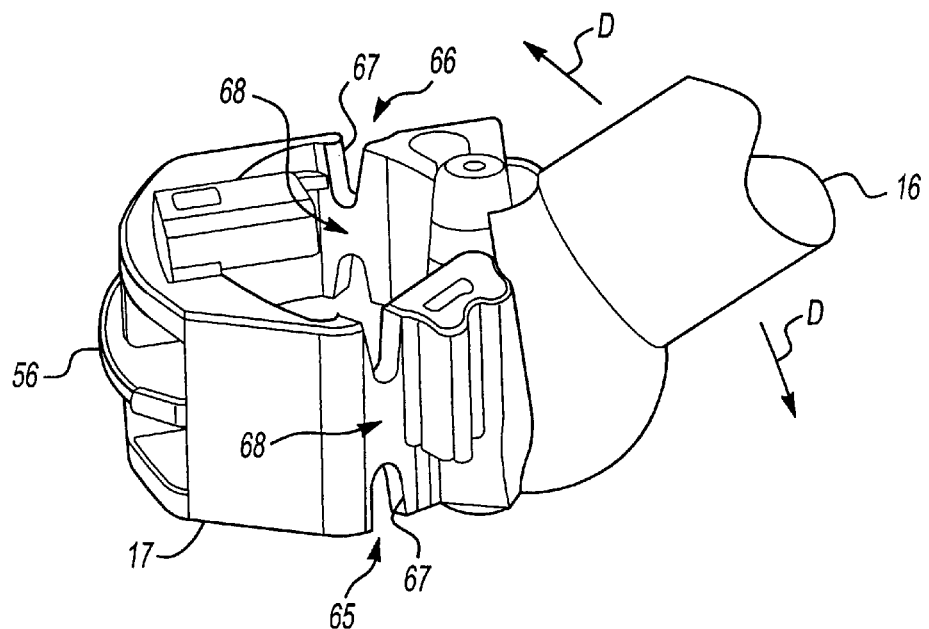
FIG. 8 is a partial perspective view of the lever showing relief notches between the control frame and the lever arm.

Lever 11 is intended to pivot only in the pivot plane defined by pivot post 18, pivot holes 20 and 22, tongue 57, and groove 56 (arrows A in FIG. 1). Nevertheless, it is possible that forces not aligned with the pivot plane would be applied to lever 11 such as indicated by arrows D in FIG. 8. Components of such forces that are perpendicular to the pivot plane could tend to cause sliding contacts 25 and 26 to disengage the circuit traces on circuit board 27 due to the necessary clearances to permit rotation of lever 11 within housing 12. Consequently, the present invention provides isolators 65 and 66 between control frame 17 and lever arm 16 in order to isolate control frame 17 from movement of lever arm 16 which is perpendicular to the pivot plane. Isolators 65 and 66 are substantially rigid with respect to forces applied in the pivot plane but are flexible with respect to forces applied perpendicular to the pivot plane.

In a preferred embodiment, isolators 65 and 66 are comprised of flexible joints 68 which are created by forming relief notches 67 in lever 11. Flexible joints 68 can flex when lever arm 16 is moved in the direction shown by arrows D to allow contacts 25 and 26 to stay in sliding contact with circuit board 27.

What is claimed is:

1. A multifunction switch apparatus comprising:

a lever including a lever arm having a distal end for manually manipulating said multifunction switch apparatus, a control frame at a proximal end of said lever, and a longitudinal bore therein;

a case for pivotally retaining said control frame for movement in a pivot plane defined by a pivot axis;

a circuit board mounted in said case and comprising circuit traces on a surface thereof;

a first contact mounted to said control frame and slidably contacting said circuit traces;

a rod movably retained in said longitudinal bore and having a proximal end and a distal end, said rod including a radial control arm;

a contact carrier rotatably mounted within said control frame and contacting said drive surface so that said contact carrier rotates in response to axial rotation of said rod;

a second contact mounted to said contact carrier and slidably contacting said circuit traces; and an isolator between said lever arm and said control frame for isolating said control frame from movement of said lever arm perpendicular to said pivot plane.

2. The switch apparatus of claim 1 wherein said isolator is substantially rigid with respect to forces applied in said pivot plane and is flexible with respect to forces applied perpendicular to said pivot plane that would otherwise tend to separate said first contact from said circuit traces.

3. The switch apparatus of claim 1 further comprising a cylindrical ring at said distal end of said rod for manually applying axial rotation force to said rod.

4. The switch apparatus of claim 1 further comprising a button cap at said distal end of said rod for manually applying longitudinal force to said rod.

5. The switch apparatus of claim 1 further comprising first detents in said case providing predetermined pivot positions of said control frame within said case.

6. The switch apparatus of claim 1 further comprising second detents in said lever arm providing predetermined axial positions of said rod within said longitudinal bore.

7. The switch apparatus of claim 1 wherein said multifunction switch is an automotive wiper/washer stalk switch and wherein said first contact controls a wiper on/off/intermittent function, said second contact controls an intermittent wiper delay function, and said on/off contact switch controls a washer function.

8. The switch apparatus of claim 1 further including a plunger biased in a first position and having a cam surface for receiving said drive surface and moving into a second position in response to longitudinal movement of said rod, said plunger including an actuator surface; and an on/off contact switch mounted to said circuit board and making selectable contact in response to said actuator surface.

9. A multifunction switch apparatus comprising:

a lever including a lever arm having a distal end for manually manipulating said multifunction switch apparatus, a control frame at a proximal end of said lever, and a longitudinal bore therein;

a case for pivotally retaining said control frame for movement in a pivot plane defined by a pivot axis;

a circuit board mounted in said case and comprising circuit traces on a surface thereof;

a first contact mounted to said control frame and slidably contacting said circuit traces; and an isolator between said lever arm and said control frame for isolating said control frame from movement of said lever arm perpendicular to said pivot plane, wherein said isolator is substantially rigid with respect to forces applied in said pivot plane and is flexible with respect to forces applied perpendicular to said pivot plane that would otherwise tend to separate said first contact from said circuit traces, and wherein said isolator is comprised of a flexible joint formed by creating at least one relief notch between said lever arm and said control frame.

10. The switch apparatus of claim 9 wherein said flexible joint is comprised of first and second relief notches, said relief notches being substantially axially aligned with one another and substantially parallel to said pivot axis.

11. The switch apparatus of claim 9 further including:

a rod movably retained in said longitudinal bore and having a proximal end and a distal end, said rod including a radial control arm;

a contact carrier rotatably mounted within said control frame and contacting said drive surface so that said contact carrier rotates in response to axial rotation of said rod; and a second contact mounted to said contact carrier and slidably contacting said circuit traces.

12. The switch apparatus of claim 11, wherein said rod includes a drive surface at said proximal end, and said switch apparatus further includes;

a plunger biased in a first position and having a cam surface for receiving said drive surface and moving into a second position in response to longitudinal movement of said rod, said plunger including an actuator surface; and an on/off contact switch mounted to said circuit board and making selectable contact in response to said actuator surface.

13. A multifunction switch apparatus comprising:

a lever including a lever arm having a distal end for manually manipulating said multifunction switch apparatus, a control frame at a proximal end of said lever, and a longitudinal bore therein;

a case for pivotally retaining said control frame for movement in a pivot plane defined by a pivot axis;

a circuit board mounted in said case and comprising circuit traces on a surface thereof;

a first contact mounted to said control frame and slidably contacting said circuit traces;

a rod movably retained in said longitudinal bore and having a proximal end and a distal end, said rod including a radial control arm and a drive surface at said proximal end;

a contact carrier rotatably mounted within said control frame and contacting said drive surface so that said contact carrier rotates in response to axial rotation of said rod;

a second contact mounted to said contact carrier and slidably contacting said circuit traces;

a plunger biased in a first position and having a cam surface for receiving said drive surface and moving into a second position in response to longitudinal movement of said rod, said plunger including an actuator surface; and an on/off contact switch mounted to said circuit board and making selectable contact in response to said actuator surface, wherein said on/off contact switch is biased to be normally closed and is held open by said actuator surface when said plunger is in said first position.

14. The switch apparatus of claim 13 further comprising an isolator between said lever arm and said control frame for isolating said control frame from movement of said lever arm perpendicular to said pivot plane.

15. The switch apparatus of claim 14 wherein said isolator is substantially rigid with respect to forces applied in said pivot plane and is flexible with respect to forces applied perpendicular to said pivot plane that would otherwise tend to separate said first contact from said circuit traces.

16. The switch apparatus of claim 15 wherein said isolator is comprised of a flexible joint formed by creating at least one relief notch between said lever arm and said control frame.

* * * * *